United States Patent
Tzadok

(10) Patent No.: US 11,639,985 B2
(45) Date of Patent: May 2, 2023

(54) THREE-DIMENSIONAL FEATURE EXTRACTION FROM FREQUENCY MODULATED CONTINUOUS WAVE RADAR SIGNALS

(71) Applicant: International Business Machines Corporation, Armonk, NY (US)

(72) Inventor: Asaf Tzadok, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 16/919,129

(22) Filed: Jul. 2, 2020

(65) Prior Publication Data
US 2022/0003840 A1   Jan. 6, 2022

(51) Int. Cl.
*G01S 7/41* (2006.01)
*G01S 7/35* (2006.01)
*G06V 20/64* (2022.01)

(52) U.S. Cl.
CPC .............. *G01S 7/417* (2013.01); *G01S 7/352* (2013.01); *G01S 7/411* (2013.01); *G01S 7/415* (2013.01); *G06V 20/653* (2022.01)

(58) Field of Classification Search
CPC .......... G01S 7/417; G01S 7/352; G01S 7/411; G01S 7/415; G01S 7/003; G01S 13/89; G01S 2013/0245; G01S 7/354; G01S 7/356; G01S 13/345; G01S 13/343; G06V 20/653
See application file for complete search history.

(56) References Cited

U.S. PATENT DOCUMENTS

| | | | |
|---|---|---|---|
| 9,575,560 B2 | 2/2017 | Poupyrev | |
| 10,451,712 B1* | 10/2019 | Madhow | G01S 13/723 |
| 2010/0152600 A1* | 6/2010 | Droitcour | A61B 5/1113 |
| | | | 600/534 |
| 2018/0106897 A1* | 4/2018 | Shouldice | A61B 5/4818 |
| 2019/0011534 A1* | 1/2019 | Trotta | G01S 13/89 |
| 2019/0243458 A1 | 8/2019 | Wang | |
| 2020/0097092 A1 | 3/2020 | Tzadok | |
| 2020/0225321 A1* | 7/2020 | Kruglick | G01S 7/417 |
| 2020/0292660 A1* | 9/2020 | Meissner | G01S 13/931 |

(Continued)

FOREIGN PATENT DOCUMENTS

| | | |
|---|---|---|
| CN | 107024685 A | 8/2017 |
| CN | 108509910 A | 9/2018 |

(Continued)

OTHER PUBLICATIONS

"Project Soli—Google ATAP", Google, retrieved from the Internet on Apr. 13, 2020, 4 pages, <https://atap.google.com/soli/>.

(Continued)

*Primary Examiner* — Donald H B Braswell
(74) *Attorney, Agent, or Firm* — David K. Mattheis

(57) ABSTRACT

Motion-related 3D feature extraction by receiving a set of sequential radar signal data frames associated with a subject, determining radar signal amplitude and phase for each data frame, determining radar signal phase changes between sequential data frames, and extracting, by a trained machine learning model, one or more three-dimensional features from the sequential radar signal data frames according to the radar signal amplitude and the radar signal phase changes between sequential data frames.

20 Claims, 6 Drawing Sheets

(56) References Cited

U.S. PATENT DOCUMENTS

| | | | | |
|---|---|---|---|---|
| 2020/0300970 A1* | 9/2020 | Nguyen | ............... | G06V 10/764 |
| 2020/0400810 A1* | 12/2020 | Cho | ........................ | G01S 7/352 |
| 2021/0156957 A1* | 5/2021 | Gillian | .................... | G01S 7/417 |
| 2022/0022756 A1* | 1/2022 | Kiuru | ................. | A61B 5/02444 |

FOREIGN PATENT DOCUMENTS

| | | |
|---|---|---|
| CN | 110705501 A | 1/2020 |
| CN | 110941331 A | 3/2020 |

OTHER PUBLICATIONS

Hazra et al., "Short-Range Radar-based Gesture Recognition System using 3D CNN with Triplet Loss", IEEE Access, vol. 4, 2016, DOI 10.1109/ACCESS.2019.2938725, 11 pages.

Lien et al., "Soli: Ubiquitous Gesture Sensing with Millimeter Wave Radar", SIGGRAPH 2016, Jul. 24-28, 2016, Anaheim, CA, ISBN: 978-1-4503-4279-7/16/07, DOI: http://doi.acm.org/10.1145/2897824.2925853, 19 pages.

Shirakawa et al., "3D-Scan Millimeter-Wave Radar for Automotive Application", Fujitsu Ten Technical Journal, No. 38 (2013), 5 pages.

Smith et al., "Micro-Doppler Signature Classification", ©2006 IEEE, 0-7803-9582-4/06/$20.00, 4 pages.

Wang et al., "Interacting with Soli: Exploring Fine-Grained Dynamic Gesture Recognition in the Radio-Frequency Spectrum", UIST 2016, Oct. 16-19, 2016, Tokyo, Japan, Copyright 2016, ACM ISBN 978-1-4503-4189-9/16/10, http://dx.doi.org/10.1145/2984511.2984565, 10 pages.

Zhang et al., "Object Detection and 3D Estimation via an FMCW Radar Using a Fully Convolutional Network", Preprint—Feb. 2019, DOI: 10.13140/RG.2.2.15796.91521, 6 pages.

\* cited by examiner

Fig. 2

THREE-DIMENSIONAL FEATURE EXTRACTION FROM FREQUENCY MODULATED CONTINUOUS WAVE RADAR SIGNALS

BACKGROUND

The disclosure relates generally to feature extraction utilizing frequency-modulated, continuous-wave (FMCW) radar signals. The disclosure relates particularly to three-dimensional feature extraction from FMCW three-dimensional (3D) radar signals utilizing machine learning models.

Phased array FMCW 3D radar systems enable the detection of objects at short to medium—10 cm to-300 m—ranges. Artificial intelligence systems enable the automated analysis of radar system data including the identification of defined motions.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the extraction of three-dimensional features from FMCW signals using machine learning models.

Aspects of the invention disclose methods, systems and computer readable media associated with three-dimensional feature extraction by receiving a set of sequential radar signal data frames, determining radar signal amplitude and phase for each data frame, determining radar signal phase changes between sequential data frames, and extracting, by a trained machine learning model, one or more three-dimensional features from the sequential radar signal data frames according to the radar signal amplitude and the radar signal phase changes between sequential data frames.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 2 illustrates signal data transformations, according to an embodiment of the invention.

DETAILED DESCRIPTION

Figure 1:
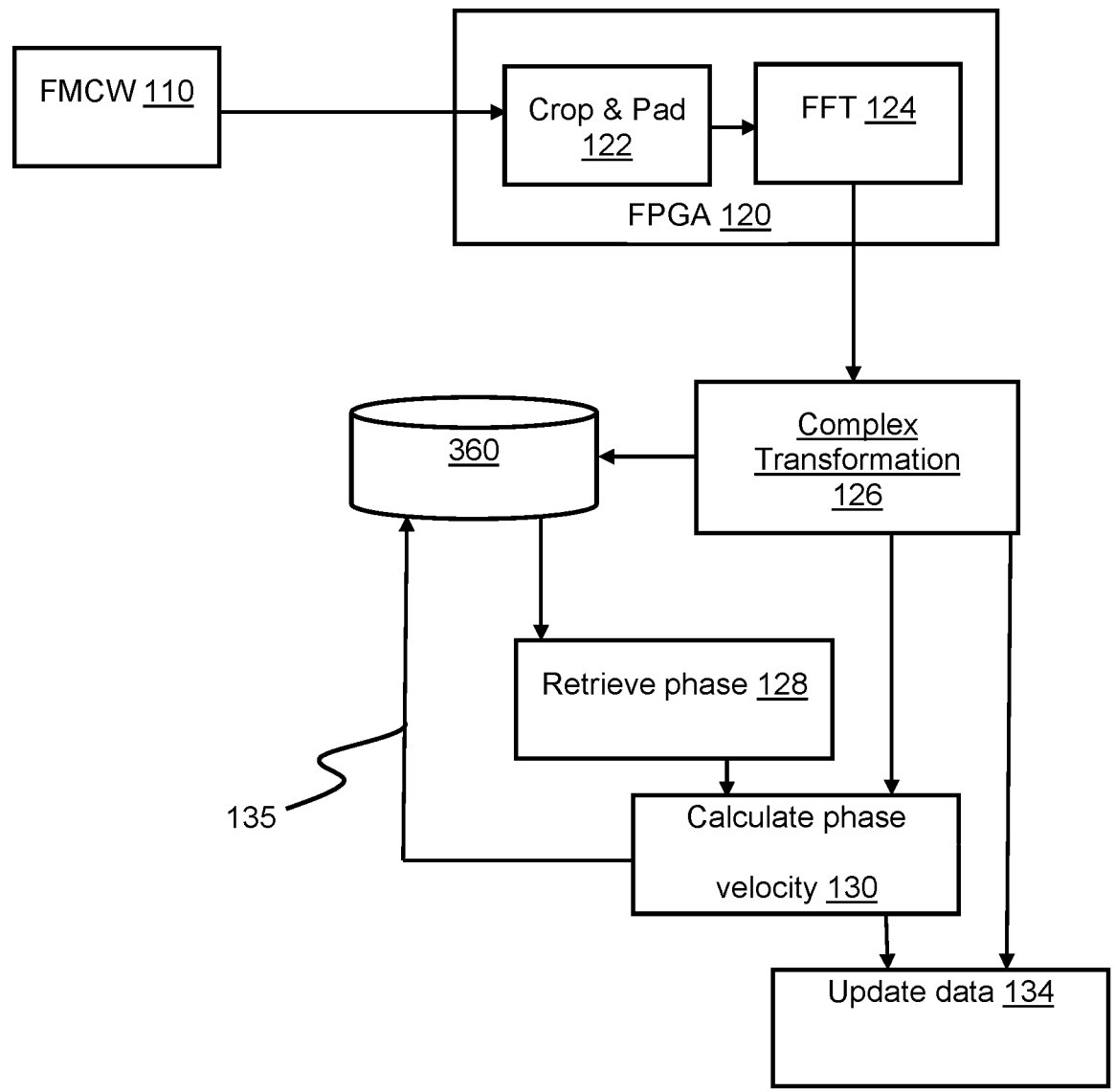
FIG. 1 provides a data flow diagram, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., determining radar signal amplitude and phase for a data frame, determining relative radar signal phase changes between sequential data frames, extracting one or more three-dimensional features from the sequential radar signal data frames according to the radar signal amplitude and the relative radar signal phase changes between sequential data frames, etc.). These solutions are not abstract and cannot be performed as a set of mental acts by a human due to the processing capabilities needed to facilitate three-dimensional feature extraction, for example. Further, some of the processes performed may be performed by a specialized computer for carrying out defined tasks related to memory operations. For example, a specialized computer can be employed to carry out tasks related to three-dimensional feature extraction or the like.

In an embodiment, a method begins by receiving a set of sequential phased-array radar data frames. A phased array radar antenna includes a plurality of send-receive antenna elements in at least a one-dimensional array, typically in a two-dimensional array. By sending signals of progressively different phase from the plurality, the system steers the direction of the overall beam without any need to move any portion of the array. The set of sent beams interferes due to the progression of phase differences, yielding a combine beam in a desired direction. The direction changes according to the progression of phase differences. The direction may be shifted left, right, up, or down between each sent pulse. The system sends a sequence of pulses or "chirps". The array receives a corresponding sequence of return signals over time as the sent chirps bounce off an object in their path and are reflected back toward the array. In this embodiment, the system utilizes saw-tooth chirps of rising frequency from 100 MHz to 1.1 GHz, as opposed to Doppler radar systems using triangular waves having both rising frequency and falling frequency components. In this embodiment, a radar chip uses a phased-array antenna propagation pattern. Such pattern provides a 3D radar output that provides a radial-shaped voxel response. Similar to a pixel containing data associated with a two-dimensional area, a voxel includes data associated with a three-dimensional volume. The voxel's volume increases as the square of the range from the array as the propagated beam spreads with distance. In this embodiment, angular steps of voxels are collected over sequences of five 3-degree steps, both horizontally and vertically, from each antenna array, for a set of twenty-five voxels for each antenna array.

In this embodiment, the beam direction of each antenna array is stepped over a 5×5 grid in the X and Y directions, resulting in 25 beam directions per frame. As an example, for one row of the 5×5 array, the array directs the beam of an antenna array 6 degrees to the left of 0, 0 in a two dimensional planar coordinate system, the progression of beams for this row follows as 3 degrees to the left, straight out 3 degrees to the right and then 6 degrees to the right. Similarly, a progression from 6 degrees down to 6 degrees up, yields the five rows of the data frame array. Using a capture speed of 100,000 radar readings per second, the frame rate is 4000 Hz. A 31.25 MHz analog to digital converter (ADC) is used to continuously capture the FMCW analog response, resulting in 312 raw time domain samples per direction.

It is noted that, although the method and algorithms used in explaining the present invention involve the 1 GHz bandwidth, such bandwidth is not to be considered as a limitation for this method. Rather, it is noteworthy that the present invention has been demonstrated as being efficient even under this narrow bandwidth condition. Further, although 1 GHz is used as an example, the example bandwidth used may vary from 50 MHz to beyond 1.4 GHz.

Initial processing of the radar data yields complex fast Fourier transform (FFT) data from the raw signal data. The complex FFT data transforms the received radar signal from time-domain data to frequency domain data, represented by a set of complex numbers (e.g., $z_{i111}$ of the form (a +bi), one complex number for each input, or voxel of each input data frame having components in the real and complex planes. The number of complex numbers depends upon on the ADC speed, in an embodiment, the method yields 40% of the number of time-domain samples per radar reading, which is 80% of the Nyquist rate.

Further transformation of the complex FFT data yields frequency dependent signal amplitude and phase data for each radar reading; (e.g., $z_{i111}$ transforms to $r_{i111}$, $\theta_{i111}$) The method stores the frequency dependent amplitude and phase data for each frame in transitory random-access memory pending further computations relating to changes between data frames. Accordingly, each radar frame has a volumetric representation of the same data that can be presented as 3D voxels.

Figure 3:
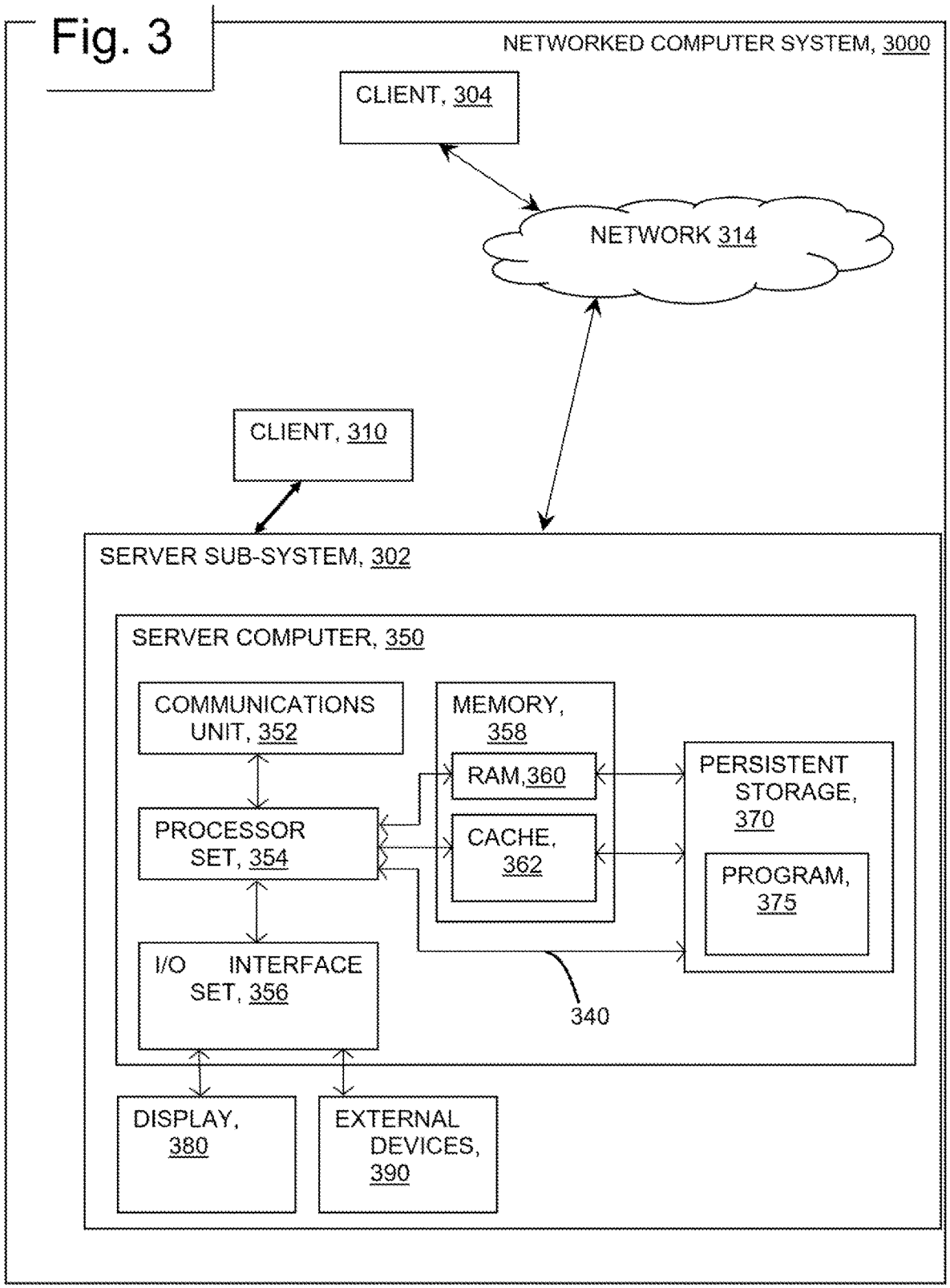
FIG. 3 provides a schematic illustration of a computing environment, according to an embodiment of the invention.

In an embodiment, illustrated in FIG. 1, an FMCW radar 110, streams time domain input data and provides trigger (data window start, end) and beam direction ID (identifying the beam amongst the array of beams) to a field programmable gate array (FPGA) 120, the FPGA 120 forms a portion of the processor set of server computer 350 of FIG. 3, The FPGA crop and pad module 122, crops or pads the input data with zeros to match closest N=2 m length which is required by the FFT module 124. For example, input data with 252 frames will be padded with 4 frames of zeros to reach the required 256 ($2^8$) frames, an input data set with 132 frames will be cropped by 4 frames to yield 128 (27) frames for the FFT process. The FPGA FFT module 124, computes a complex FFT in O(N*Log(N)) calculations in 16 bit fixed point. The method transforms the complex FFT output to phase/amplitude values for each frame of input data at block 126. This conversion transforms complex (z=a+bi) Cartesian coordinate data to polar (r,Θ) data where r corresponds to signal amplitude and Θ, corresponds to the signal's phase angle. The method saves previous phase vector for each ID value in a phase RAM 360. The phase for each beam of the data frame is saved as a separate value in the RAM 360. For each frame of data, the method retrieves the previous data frames phase from RAM at block 128, and calculates delta phase at 130, including conditions to handle phase cyclic value at 2π, between consecutive frames of data, $\partial\Theta/\partial t_d = \theta_d - prev\theta_d$ If $(\partial\Theta/\partial t_d) > \pi) \{\partial\Theta/\partial t_d -= \pi\}$ Where: $\theta \in \{0, 2\pi\}$, and d is the index for the range, between 0 to N/2

After each new phase velocity calculation, the method overwrites, path 135, the phase values in RAM 360, with the phase values for the current frame of data. The method updates the current frame with the calculated amplitude and delta phase at block 134. In this embodiment, the method computes O(N) calculations using vector operations in 32 bit floating point.

A further transformation of the signal amplitude and phase data $r_{i111}$, $\theta_{i111}$, yield a four-dimensional tensor including spatial location as well as magnitude and phase velocity data, $r_{i111}$, $\partial\Theta/\partial t_{i111}$, across the frequencies of the radar signal bandwidth. As used herein phase velocity refers to the calculated phase velocity vector providing magnitude and direction data associated with the relative phase change from one data frame to the next data frame. In an embodiment, the method assumes a phase change of less than pi, allowing the method to solve the jump between 2*pi and 0 degrees. The complete data processing function starts with raw time-domain radar return waveform data and outputs four-dimensional tensors, including inter-frame phase velocity data. In an embodiment, one or more FPGA perform the set of transformations from raw data to four-dimensional tensors. The four-dimensional tensor data for each data frame includes data relating the location of each voxel relative to the antenna array, as well as the phase velocity data associated with each data frame transition.

Figure 2:
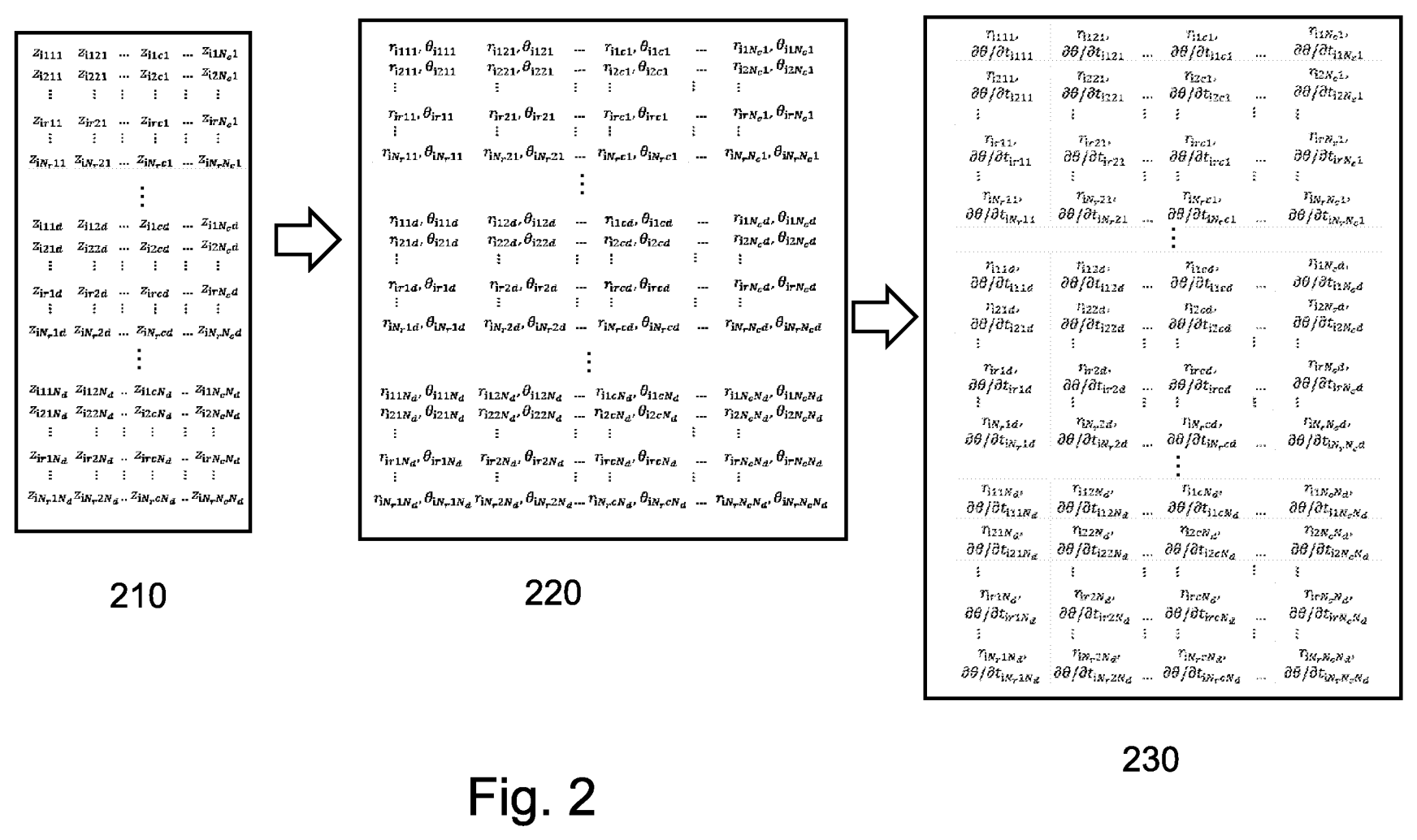

FIG. 2 illustrates the transformation of complex FFT data to polar amplitude and phase data to the four-dimensional tensor. As shown in the Figure, the method converts input FFT complex data 210, ranging from $zi_{111}$ to $z_{iNrNcNd}$, to amplitude and phase data 220, ranging from $r_{i111}$, $\Theta_{i111}$ to $r_{iNrNcNd}$, $\Theta_{iNrNcNd}$. The method then computes the inter-frame phase velocities, and outputs the 4D tensor 230, with data ranging from $r_{i111}$, $\delta\Theta/\delta t_{i111}$ to $r_{iNrNcNd}$, $\delta\Theta/\delta t_{iNrNcNd}$.

In an embodiment, the method provides the four-dimensional tensor data from each data frame to an artificial intelligence (AI) architecture for further processing. In an embodiment, the AI includes a deep 3D convolutional neural network (CNN) trained to extract directional signal changes over time—signals associated with objects moving within the sensing field of the radar system. The 3D CNN processes input data over three dimensions to extract features according to the training of the 3D CNN. In this embodiment, the AI extracts features associated with changes in the direction of return of radar signals between successive data frames received over a defined temporal range. In this embodiment, each data frame includes the 5×5 array of signal returns for each antenna array considered over a shallow depth or depth of field such that the signal analysis focuses upon a shorter range. In an embodiment having a large number of depth cells, a deep 1D CNN structure process is applied on the depth cells for each radar frame, in order to extract depth response features. The 1D CNN processes input over a single dimension, in this case, the depth aspect of the input data. In small numbers of depth cells, the convolution filters are not applied, and the depth cells are used as depth response features. The depth response features are considered as channels and 3D filters are applied over 3 domains—time and 2D of radar directions, both vertical and horizontal.

In an embodiment, the AI extracts features associated with changes in the radar signal returns associated with defined volumetric spaces relative to the antenna array—rather than just changes in direction of return in the radar signals—using 3D convolutional neural networks trained to detect changes in signal returns from defined volumetric spaces. In this embodiment, a deep 3D CNN is applied within a radar frame, where amplitude and phase information are considered as channels and 3D filters are applied over 3 domains: depth and 2D directions, both vertical and horizontal.

In each described embodiment, the method passes the three-dimensional features extracted from the four-dimensional data to a second AI including a long short-term memory (LSTM) network adapted to extract feature trends occurring over time, or feature deviations from baseline volumes learned during training. In each embodiment, the AI detects deviations between the volumes scanned by the current set of radar returns and volumes evaluated during AI training. The AI detects differences between the current subject of the scanning and similar subjects scanned and presented as part of the AI training data set. For example, a human subject may be scanned to determine a nominal volume of the subject for the trained network. Subsequent scanning of the subject processed by the trained network would assist in identifying concealed objects carried by the subject. Similarly, changes in scanning data of a manufactured part from the volumes learned by the training assist in detecting defects in the new items. In this embodiment, the LSTM networks analyze sequences of three-dimensional feature data extracted from the four-dimensional tensor data, to extract data trends associated with gestures made by an observed subject, or temporal-volumetric deviations from a baseline expectation. In an embodiment, the trend data outputs from the LSTM networks pass to fully connected deep neural network layers. The DNN classifies the trend data as subject gestures or classified temporal-volumetric deviations.

Training the respective AI structures includes providing data sets of labeled subject gesture (temporal and directional) data, or nominal subject volume scanning data, derived from phased array radar signals processed as data frames as described above. The gesture training data sets include data frames associated with subject gestures observed from varying angles of incidence as well as from different ranges from the antenna array. The temporal-volumetric training data set includes scans of nominal subjects from different angels and motion states—moving toward, away from and across the field of view of the radar array both left to right and right to left. In an embodiment, the AI structure's training data sets include 5, 15, and 125 data frame sequences, corresponding to about 1.25 ms, 6.25 ms and 31.2 ms, respectively. During training the node weights of the 3D CNN, LSTM and DNN portions of each AI structure are refined such that the final classified gesture, or temporal-volumetric deviation output, successfully predicts the label associated with input data frames of the respective training data sets.

FIG. 3 provides a schematic illustration of exemplary network resources associated with practicing the disclosed inventions. The inventions may be practiced in the processors of any of the disclosed elements which process an instruction stream. As shown in the figure, a networked Client device 310 connects wirelessly to server sub-system 302. Client device 304 connects wirelessly to server sub-system 302 via network 314. Client devices 304 and 310 comprise motion-related feature extraction program (not shown) together with sufficient computing resource (processor, memory, network communications hardware) to execute the program. In an embodiment, client device 304 and 310 include one or more phased array radar systems capturing raw radar signal returns for processing by the disclosed systems. As shown in FIG. 3, server sub-system 302 comprises a server computer 350. FIG. 3 depicts a block diagram of components of server computer 350 within a networked computer system 3000, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 350 can include processor(s) 354, memory 358, persistent storage 370, communications unit 352, input/output (I/O) interface(s) 356 and communications fabric 340. Communications fabric 340 provides communications between cache 362, memory 358, persistent storage 370, communications unit 352, and input/output (I/O) interface(s) 356. Communications fabric 340 can be implemented with any architecture designed for passing data and/or control information between processors (such as microprocessors, communications and network processors, etc.), system memory, peripheral devices, and any other hardware components within a system. For example, communications fabric 340 can be implemented with one or more buses.

Memory 358 and persistent storage 370 are computer readable storage media. In this embodiment, memory 358 includes random access memory (RAM) 360. In general, memory 358 can include any suitable volatile or non-volatile computer readable storage media. Cache 362 is a fast memory that enhances the performance of processor(s) 354 by holding recently accessed data, and data near recently accessed data, from memory 358.

Program instructions and data used to practice embodiments of the present invention, e.g., the three-dimensional feature extraction program 375, are stored in persistent storage 370 for execution and/or access by one or more of the respective processor(s) 354 of server computer 350 via cache 362. In this embodiment, persistent storage 370 includes a magnetic hard disk drive. Alternatively, or in addition to a magnetic hard disk drive, persistent storage 370 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 370 may also be removable. For example, a removable hard drive may be used for persistent storage 370. Other examples include optical and magnetic disks, thumb drives, and smart cards that are inserted into a drive for transfer onto another computer readable storage medium that is also part of persistent storage 370.

Communications unit 352, in these examples, provides for communications with other data processing systems or devices, including resources of client computing devices 304, and 310. In these examples, communications unit 352 includes one or more network interface cards. Communications unit 352 may provide communications through the use of either or both physical and wireless communications links. Software distribution programs, and other programs and data used for implementation of the present invention, may be downloaded to persistent storage 370 of server computer 350 through communications unit 352.

I/O interface(s) 356 allows for input and output of data with other devices that may be connected to server computer 350. For example, I/O interface(s) 356 may provide a connection to external device(s) 390 such as a keyboard, a keypad, a touch screen, a microphone, a digital camera, and/or some other suitable input device. External device(s) 390 can also include portable computer readable storage media such as, for example, thumb drives, portable optical or magnetic disks, and memory cards. Software and data used to practice embodiments of the present invention, e.g., three-dimensional feature extraction program 375 on server computer 350, can be stored on such portable computer readable storage media and can be loaded onto persistent storage 370 via I/O interface(s) 356. I/O interface(s) 356 also connect to a display 380.

Display 380 provides a mechanism to display data to a user and may be, for example, a computer monitor. Display 380 can also function as a touch screen, such as a display of a tablet computer.

Figure 4:
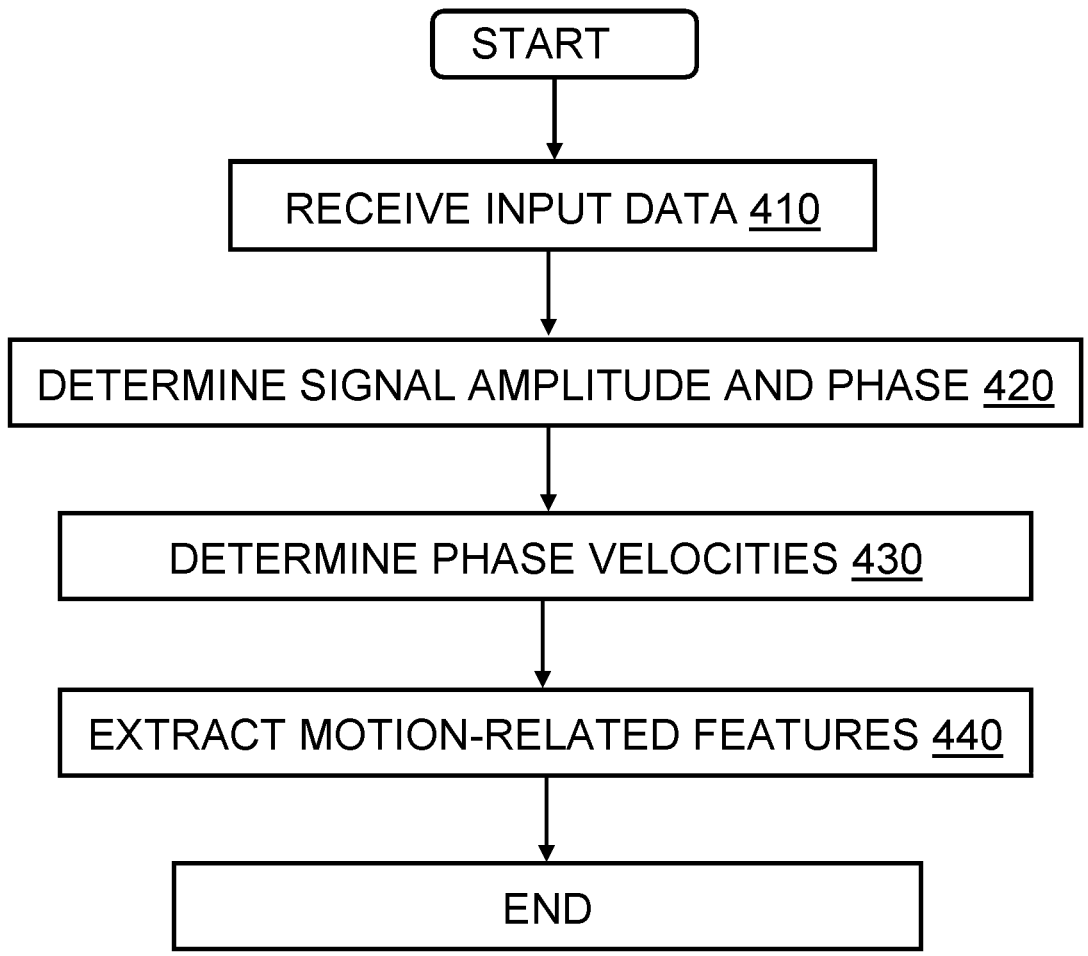
FIG. 4 provides a flowchart depicting an operational sequence, according to an embodiment of the invention.

FIG. 4 provides a flowchart 400, illustrating exemplary activities associated with the practice of the disclosure. After program start, at block 410, the method of three-dimensional feature extraction program 175, receives phased array radar raw signal return data from one of more phased array radar systems. The received data include signal returns in the form of a sequence of data frames associated with sequential radar signal returns captured by the phased array radar transceiver. At block 420, the method processes the raw data, and the processing yields a complex FFT transformation of the data. Further processing yields a determination of the signal magnitude and phase for each input data frame from the FFT transformation. At block 420, the method determines inter-frame phase velocities between successive data frames. Overall, the processing of the method provides a four-dimensional tensor, including horizontal, vertical, and depth based spatial data, as well as signal magnitude and phase velocity data for the sequence of data frames at block 430.

At block 440, an AI structure extracts three-dimensional features from the four-dimensional tensor data using a 3D CNN structure in conjunction with one or more LSTM networks and a fully connected neural network. In an embodiment, training the AI structure includes processing labeled subject gestures, or nominal subject volume data sets of 5, 25, and 125 sequential data frames.

Figure 5:
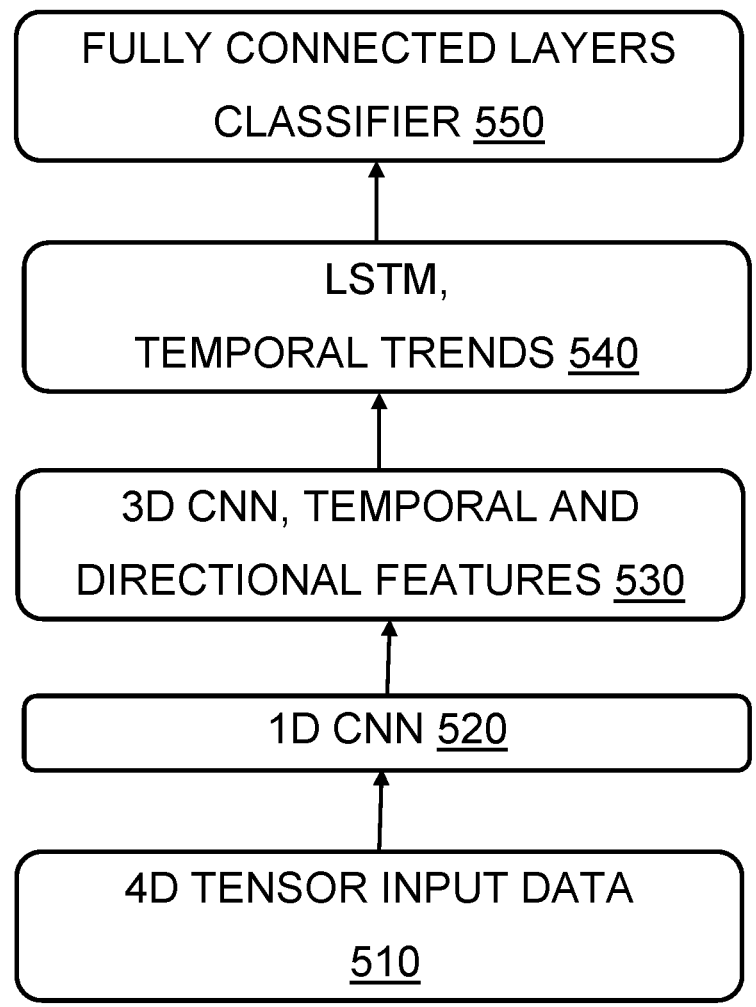
FIG. 5 provides a schematic illustration of a machine learning module architecture, according to an embodiment of the invention.

FIG. 5 illustrates the functional components of an AI structure, according to an embodiment of the invention. Use of this structure enables the rapid recognition of fast-moving objects such as recognizing two-handed gestures of a human subject working in a hands-free environment. As shown in functional block diagram 500, input block 510 receives the 4D tensor input data from a phased array radar signal processor. The input includes Nf radar data frames with spatial as well as signal magnitude and inter-frame phase velocity data. At block 520, a 1D CNN processes the input data, reducing the dimensionality of the input data and identifying those input data portions most likely to contain features of interest. The identified portions are passed to a 3D CNN for temporal and directional feature extraction at block 530. In an embodiment, the 3D CNN analyses the input data using a shallow depth of field, each data frame includes multiple 5×5 arrays of signals, each evaluated over a short depth dimension as well as horizontal and vertical dimensions, to evaluate the entire depth range of the processed signals. At block 540, the extracted temporal and directional features from block 530 are evaluated for patterns or trends in the inter-frame phase velocity data, using trained LSTM networks. Identified trends—features—are passed to fully connected neural network layers at block 550 for classification of the extracted features as subject motion related gestures, or other temporal-volumetric signature according to the training of the fully connected neural network. As an example, each training set hand gesture, hands spreading apart, hands coming together, a hand moving in an arcing motion, hands circling each other, etc., yields a unique 3D feature set after analysis of the input data. Labeled input data of the training set then results in the fully connected recurrent neural network, or similar AI structure, classifying the extracted feature set in the real time data after matching it to the patterns and trends observed in the training data set.

Figure 6:
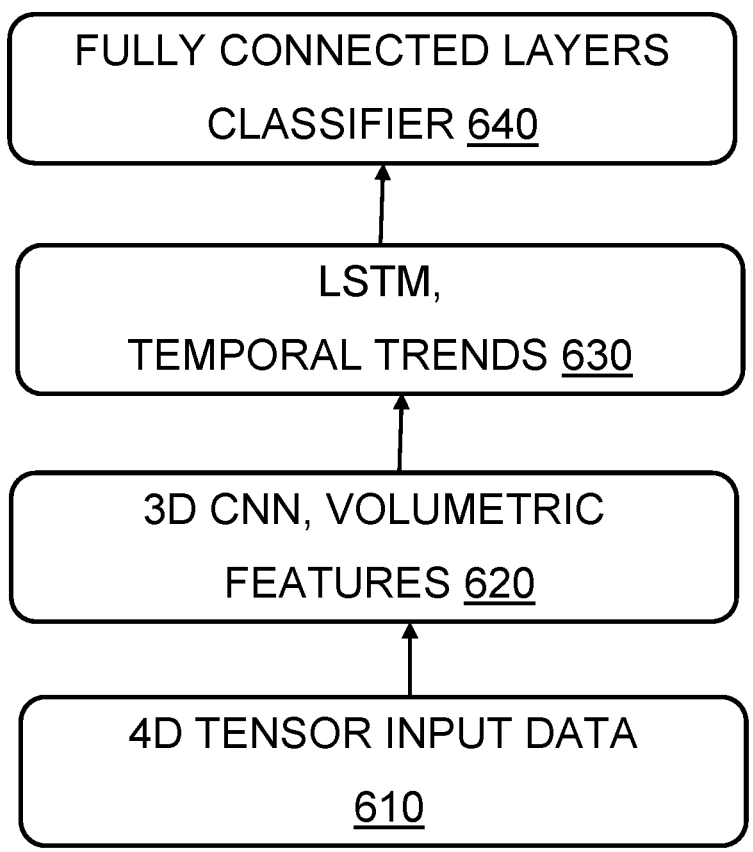
FIG. 6 provides a schematic illustration of a machine learning module architecture, according to an embodiment of the invention.

FIG. 6 illustrates the functional components of an AI structure, according to an embodiment of the invention. Use of this structure enables rapid volumetric analysis by recognizing scenarios from the training data based upon volumetric scanning of subjects which may not be fast moving but may have small volumetric deviations from training set subjects. As shown in functional block diagram 600, input block 610 receives the 4D tensor input data from a phased array radar signal processor. The input includes Nf radar data frames with spatial as well as signal magnitude and inter-frame phase velocity data. The input data passes to a 3D CNN for volumetric feature extraction at block 620. In an embodiment, the 3D CNN analyses the input data using a relatively long depth of field together with associated horizontal and vertical (length and height) considerations for each voxel of the depth of field of the input data, each data frame includes a 5×5 arrays of signals, each signal including a plurality of depth data covering the range of the phased array radar transceiver, to evaluate the entire depth range of the processed signals. At block 630, the extracted volumetric features from block 620 are evaluated for patterns or trends in the inter-frame phase velocity data, using LSTM networks. Identified trends—features—are passed to fully connected neural network layers at block 640 for classification of the extracted features as temporal-volumetric signature according to the AI training data set. In an embodiment, the training data set includes radar scan data associated with a subject moving through the radar field under varying conditions, nominal and also carrying various concealed objects, thereby changing the volumetric analysis of the subject. From such a training set the AI learns to recognize deviations from nominal and to also classify specific deviations.

In an embodiment, the method provides the output of the three-dimensional feature extraction system to a human computer interface system as a series of recognized subject gestures. In this embodiment, the system radar scans the motions of a human subject interacting with a system to recognize hand gestures made by the subject, such as swipe right, swipe left, enabling hands-free interactions with the system. The interface receives the series of classified gestures and takes action according to the programming associated with each classified gesture.

In an embodiment, the method provides extracted three-dimensional volumetric features to an event processing system, such as a security system or quality control system configured to respond to events associated with changes from a nominal subject temporal-volumetric signature. As an example, a system is configured and trained to recognize individual subjects and to identify changes in the volume (shape) of the subject from nominal, indicating a concealed object associated with the subject. As a further example, a system trained using scans of target objects derives a baseline volume pattern for the target objects. In this method, the method evaluates subsequent real-time scans of new target objects, identifying targets having volumetric deviations from the nominal baseline determined during training of the AI.

One embodiment of the present invention uses existing mm-wave phased array transceivers that were designed for 5G mobile communication, with relatively narrow bandwidth to allow sharing between multiple users. The 5G mobile communication runs on networks operating in the 60 GHz mm-wave band. While the 60 GHz wave cannot pass through a wall as can 2.4 GHz, it allows, through a small form factor array of antennas, steering the beam narrowly for both improved energy efficiency, signal integrity, and high-speed detection. Although the system described could be a standalone system with a processor dedicated to the control and processing of the 3D radar, the system could also comprise a generic computer with a program directed to implementing the method of the present invention, such as exemplarily shown in FIG. 3.

Some embodiments of the present invention may include one, or more, of the following features, characteristics and/or advantages: no need for extensive data pre-processing techniques, which shortens reaction times and reduces required computing power for inferencing features; no need for tracking and clustering features, enabling detection involving objects in close proximity to each other; the extraction of non-trivial features as disclosed embodiments do not require clear repetitive feature signatures; machine learning based feature extraction of volumetric and directional features; and/or use of saw-tooth chirps versus longer duration triangular wave chirps.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

In one example using AI trained to extract directional and temporal features, hand gesture classification trials demonstrated an ability to quickly classify human subject hand gestures with small amounts of input data, the system achieved 70-75% accuracy in classifying gestures using as few as five data frames, with 10 frames accuracy rose to 80-85%, with 15 frames accuracy rose to 85-90%, with 20 frames accuracy rose further to 90-91%, and with 25 frames of data, accuracy rose to around 93%.

In one example use case, the AI training data set includes radar scan data for a human subject walking back and forth in front of the radar array. The subject exhibits four states, no concealed object, a concealed tablet computer, a concealed bag of nuts and bolts, and wearing a backpack filled with tools. The AI training uses a volumetric feature AI architecture to learn the volumetric features associated with each presented state. The training data set includes data instances of five, twenty-five, and one hundred twenty-five data frames. After training, the trained AI system achieved about 85% accuracy recognizing each trained state with as few as ten frames of input data.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for three-dimensional feature extraction from sequential radar signal data frames, the method comprising:
   receiving a set of sequential radar signal data frames;
   determining radar signal amplitude and phase for each data frame;
   determining radar signal phase changes between sequential data frames;
   transforming the radar signal amplitude and phase change from a previous frame for a frame to a four-dimensional tensor including spatial location as well as magnitude and phase velocity data;
   and
   extracting, by a trained machine learning model, one or more three-dimensional features from the sequential radar signal data frames according to the four-dimensional tensor including spatial location as well as magnitude and phase velocity data.

2. The computer implemented method according to claim 1, wherein the three-dimensional features comprise temporal and directional three-dimensional subject motion features according to the radar signal amplitude and radar signal phase changes between sequential data frames.

3. The computer implemented method according to claim 1, wherein the three-dimensional features comprise volumetric features according to the radar signal amplitude and radar signal phase changes between sequential data frames.

4. The computer implemented method according to claim 1, wherein determining radar signal phase changes between sequential data frames comprises determining radar signal phase velocity between sequential frames.

5. The computer implemented method according to claim 1, wherein the radar signal data frames comprise a signal bandwidth of about 1 GHz.

6. The computer implemented method according to claim 1, further comprising providing the three-dimensional features to an event recognition system.

7. The computer implemented method according to claim 1, wherein the trained machine learning model comprises one or more long short-term memory components.

8. A computer program product for three-dimensional feature extraction from sequential radar signal data frames, the computer program product comprising one or more computer readable storage devices and program instructions collectively stored on the one or more computer readable storage devices, the program instructions comprising:
   program instructions to receive a set of sequential radar signal data frames;
   program instructions to determine radar signal amplitude and phase for each data frame;
   program instructions to determine radar signal phase changes between sequential data frames;
   program instructions to transform the radar signal amplitude and phase change from a previous frame for a frame to a four-dimensional tensor including spatial location as well as magnitude and phase velocity data; and
   program instructions to extract, by a trained machine learning model, one or more three-dimensional features from the sequential radar signal data frames according to the four-dimensional tensor including spatial location as well as magnitude and phase velocity data.

9. The computer program product according to claim 8, wherein the three-dimensional features comprise temporal and directional subject motion features according to the radar signal amplitude and radar signal phase changes between sequential data frames.

10. The computer program product according to claim 8, wherein the three-dimensional features comprise volumetric features according to the radar signal amplitude and radar signal phase changes between sequential data frames.

11. The computer program product according to claim 8, wherein determining radar signal phase changes between sequential data frames comprises determining radar signal phase velocity between sequential frames.

12. The computer program product according to claim 8, wherein the radar signal data frames comprise a signal bandwidth of about 1 GHz.

13. The computer program product according to claim 8, the stored program instructions further comprising program instructions to provide the three-dimensional features to an event monitoring system.

14. The computer program product according to claim 8, wherein the trained machine learning model comprises one or more long short-term memory components.

15. A computer system for three-dimensional feature extraction from sequential radar signal data frames, the computer system comprising:
  one or more computer processors;
  one or more computer readable storage devices; and
  stored program instructions on the one or more computer readable storage devices for execution by the one or more computer processors, the stored program instructions comprising:
    program instructions to receive a set of sequential radar signal data frames;
    program instructions to determine radar signal amplitude and phase for each data frame;
    program instructions to determine radar signal phase changes between sequential data frames;
    program instructions to transform the radar signal amplitude and phase change from a previous frame for a frame to a four-dimensional tensor including spatial location as well as magnitude and phase velocity data; and
    program instructions to extract, by a trained machine learning model, one or more three-dimensional features from the sequential radar signal data frames according to the four-dimensional tensor including spatial location as well as magnitude and phase velocity data.

16. The computer system according to claim 15, wherein the three-dimensional features comprise temporal and directional subject motion features according to the radar signal amplitude and radar signal phase changes between sequential data frames.

17. The computer system according to claim 15, wherein the three-dimensional features comprise volumetric subject motion features according to the radar signal amplitude and radar signal phase changes between sequential data frames.

18. The computer system according to claim 15, wherein determining radar signal phase changes between sequential data frames comprises determining radar signal phase velocity between sequential frames.

19. The computer system according to claim 15, wherein the radar signal data frames comprise a signal bandwidth of about 1 GHz.

20. The computer system according to claim 15, the stored program instructions further comprising program instructions to provide the three-dimensional features to an event recognition system.

* * * * *